Aug. 4, 1953

R. G. GRAHAM ET AL 2,648,052

APPARATUS FOR CONNECTING PORTABLE TELEPHONES TO LINES IN THE FIELD

Filed Aug. 14, 1948

INVENTORS
ROY G. GRAHAM
OSCAR F. TALLMAN
BY E. W. Harrington
ATTORNEY

Patented Aug. 4, 1953

2,648,052

UNITED STATES PATENT OFFICE 2,648,052

APPARATUS FOR CONNECTING PORTABLE TELEPHONES TO LINES IN THE FIELD

Roy G. Graham and Oscar F. Tallman, St. Louis, Mo., assignors to James R. Kearney Corporation, St. Louis, Mo., a corporation of Missouri Application August 14, 1948, Serial No. 44,244

2 Claims. (Cl. 339—109)

This invention relates generally to telephone connecting apparatus and more specifically to apparatus for temporarily connecting portable telephone sets to overhead telephone lines for use by workmen in the field, the predominant object of the invention being to provide a simple apparatus through the use of which telephone workmen in the field may be enabled, in a very convenient manner, to connect portable telephone sets into telephone systems in order that they may communicate with their headquarters for testing purposes, giving reports, receiving instructions, and for other purposes.

Figure 1:
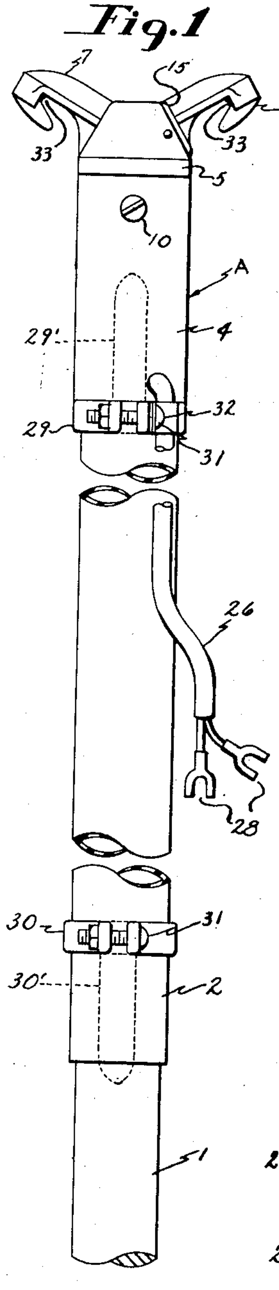
Fig. 1 is a fragmentary side elevation of the improved apparatus of this invention.
Figure 2:
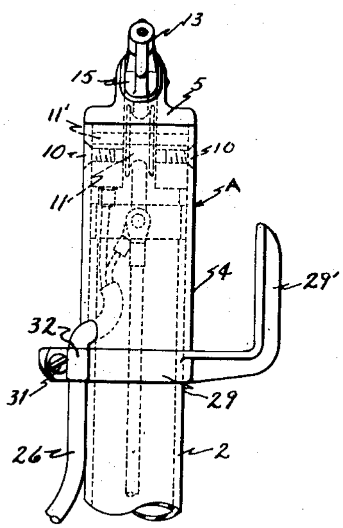
Fig. 2 is a fragmentary elevational view of the upper portion of the apparatus illustrated by Fig. 1 and taken from a different angle.

In the drawing wherein is shown for purposes of illustration, merely, one embodiment of the invention, A designates the improved apparatus of this invention generally. The apparatus A comprises an elongated pole 1, formed of wood, for instance, the upper end portion of which is received within the lower end portion of an elongated tubular member 2 which is formed of fiber, or other suitable electrical insulating material, and said tubular member being secured to the pole by means of a rivet 3. The upper end portion of the elongated tubular member 2 is telescopically received within a tubular element 4 said tubular member 2 and said tubular element 4 being suitably secured together, by cement, for instance.

Figure 3:
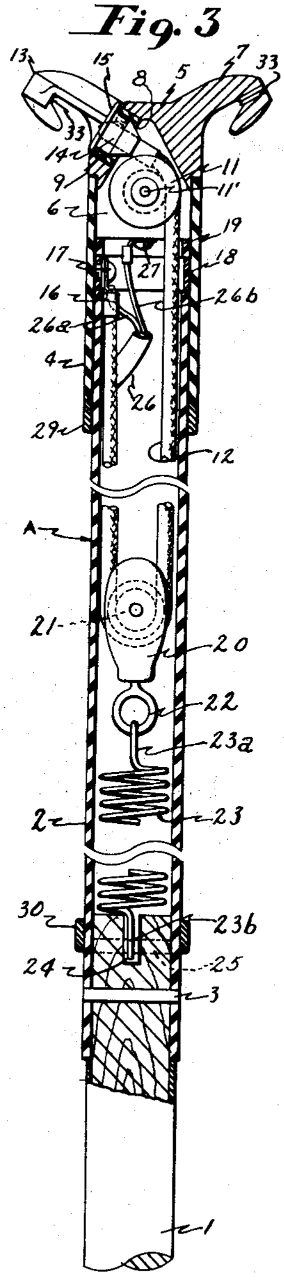
Fig. 3 is a fragmentary, vertical section view of the apparatus of this invention.

Mounted at the upper end of the tubular element 4 is a head 5 which is formed of electrically conductive material, metal, for instance, said head having a lower portion which is disposed telescopically within the upper portion of said tubular element 4. The lower portion of the head 5 has formed therein a cavity 6 which is open at the bottom of said lower portion of said head and at opposed side portions thereof, as is shown in Fig. 3. Also, the head 5 has projected therefrom at one side thereof a hook-like extension 7 which serves as a terminal, and at the opposite side of said head an opening 8 is formed through a wall portion thereof which receives a fiber sleeve 9. The head 5 is secured to the tubular element by a pair of opposed screws 10 that extend through opposed apertures formed through the wall of said tubular element and which are screwthreadedly projected into opposed screwthreaded openings formed in lower portions of the head 5 at opposite sides of the cavity 6 thereof.

Arranged within the cavity 6 of the head 5 is a sheave 11 which preferably, though not necessarily, is formed of fiber, said sheave being mounted for rotation on a shaft 11′ which is supported at its opposite ends in apertures formed in portions of the lower part of the head 5 which are located at opposite sides of said cavity 6. Operating over the sheave 11 is an electrical conductor 12 which has mechanically and electrically connected to it at an end thereof a hook member 13, said hook member serving as a terminal and having a neck portion 14 which is received within the fiber sleeve 9, and being provided with a flange 15 which is adapted to contact with the outer edge of said fiber sleeve and with an adjacent part of the head 5. The electrical conductor 12 extends downwardly within the elongated tubular member 2 in the form of an elongated loop and the end of said conductor opposed to the end thereof to which the hook member 13 is attached is provided with a clip 16 which is secured by a screw 17 to a ring 18 that is formed of electrical conductive material, metal, for instance. The ring 18 is disposed within the tubular element 4 wherein it is confined between the top edge of the elongated tubular element 2 and an annular element 19 formed preferably of fiber (Fig. 3).

Arranged at the lower end of the elongated loop formed by the electrical conductor 12 is a block 20, the sheave 21 of which rides at the lower end of said loop of said electrical conductor 12, said block being provided, with an eye 22. The eye 22 of the block 20 receives an end portion 23a of a coil spring 23, the opposite end portion 23b of said coil spring being extended into a cavity 24 formed in the upper portion of the pole 1, and said end portion 23b of said coil spring being engaged by a pin 25 which extends transversely of the upper portion of said pole and across said cavity 24.

The apparatus of the present invention includes a twin-wire electrical conductor 26, one wire 26b of which is secured by a screw 27 in electrical contact with the lower portion of the head member 5, and the other wire 26a of which is secured in electrical contact with the ring 18 by the previously mentioned screw 17. The conductor 26 passes through an opening formed through the walls of the elongated, tubular member 2 and the tubular element 4, said conductor 26 being of considerable length and the wires 26a and 26b thereof being provided at their lower ends with suitable terminals 28 which are adapted to be secured to appropriate parts of a portable telephone set (not shown). The elongated tubular member 2 is embraced by spaced, split clamps 29 and 30 which are provided with angular extensions 29′ and 30′, said split clamps being drawn into gripping engagement with said elongated tubular member 2 by screws 31. Also, the screw 31 of the split clamp 29 secures in place a clip 32 that may be formed of a suitable plastic and which engages and holds in place the conductor 26.

Figure 4:
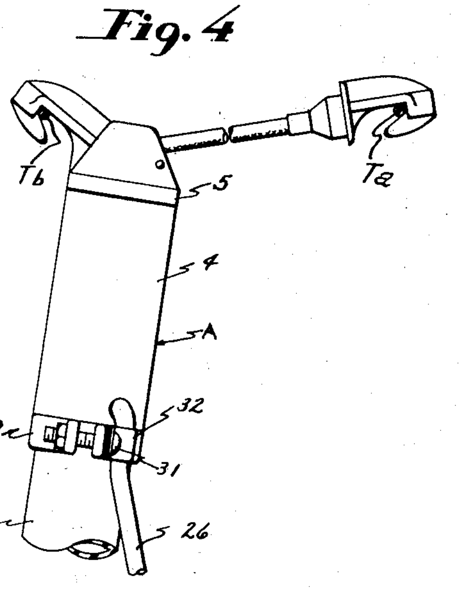
Fig. 4 is a fragmentary elevational view of the upper portion of the apparatus of this invention and illustrating the manner in which the apparatus is connected to related lines of a telephone system.

In the use of the improved connecting apparatus of this invention, a workman desiring to connect a portable telephone set into a telephone system in order that he may communicate with his headquarters, will grasp the pole 1 of the apparatus and elevate the head member 5 of the apparatus to the proper elevation to enable him to hook the hook member 13 over one of the overhead telephone lines with which contact must be made, for instance, the line Ta of Fig. 4. He will then swing the head member 5 of the apparatus away from the telephone line Ta engaged by the hook member 13 and toward the other telephone line with which contact must be made, for instance, the line Tb of Fig. 4. Such movement of the head member 5 will cause a portion of the electrical conductor 12 to be drawn outwardly from the interior of the apparatus A with the result that the loop produced by said conductor within the apparatus will be shortened so as to elevate the block 20 against the force exerted by the coil spring 23. When the head member 5 has been moved by the workman to a position immediately adjacent to the telephone line Tb the hook-like extension 7 of the head member 5 is hooked over said telephone line Tb. With the apparatus A connected to the proper telephone lines as described, the workman will attach the terminals 28 of the wires 26a and 26b of the electrical conductor 26 to a portable telephone set and said portable telephone set will then be connected into the telephone system and will be ready for use.

When the hook member 13 and the hook-like extension 7 of the head 5 are engaged with telephone lines the coil spring 23 will keep the electrical conductor 12 taut so that the points of hardened pins 33, which are set in holes formed in said hook member and said hook-like extension, will break through any oxidation present on the surfaces of the telephone lines so as to make good electrical contact between the hook member and the hook-like extension and the telephone lines. Also, when proper electrical contact has been made between the apparatus A and appropriate telephone lines, the auxiliary circuit provided by the apparatus will be made up of the hook member 13, the conductor 12, the ring 18, the wire 36a of the conductor 26, the portable telephone set (not shown), the wire 26b of the conductor 26, the head 5, and the hook-like extension 7 of said head member 5.

When it is desired to disconnect the apparatus A from telephone lines to which it is connected, the hook-like extension 7 of the head member 5 is disengaged from the telephone line to which it was connected, and the head member 5 is moved toward the other telephone line that is engaged by the hook member 13. During such movement of the head member 5 of the apparatus A, the coil spring 23 will move the block 20 downwardly so as to elongate the loop provided within the apparatus by the electrical conductor 12 and thus draw into the interior of the apparatus the portion of said conductor 12 which was extended therefrom. The hook member 13 is then disconnected from the telephone line to which it was connected and the apparatus is lowered to the ground. It is to be noted that when the apparatus A is not in use the conductor 12 is located entirely within the apparatus with the hook member 13 supported by the fiber sleeve 9 which is fixedly arranged within the opening 8 of the head member 5, as is shown to good advantage in Fig. 3. Also, when the apparatus A is not in use the electrical conductor 26 is wound about the angular extension 29′ and 30′ of the clamps 29 and 30 so that the apparatus may be conveniently carried by a workman or stored in a truck without the presence of a troublesome loose conductor.

We claim:

1. An apparatus for connecting a portable telephone set into a telephone system comprising a head member formed of electrical conductive material and provided with a telephone line engaging terminal, tubular means by which said head member is supported, a sheave disposed for rotation within a cavity formed in a portion of said head member and supported by said head member, an electrical conductor arranged within said tubular means in the form of an elongated loop and passing over said sheave, a ring formed of electrical conductive material and arranged within said tubular means to which an end portion of said electrical conductor is connected, a second telephone line engaging terminal connected to the opposite end of said electrical conductor, coil spring means which tends to resist shortening of said elongated loop of said electrical conductor when said electrical conductor is drawn outwardly from said tubular means, a block having a sheave which rides at the bottom of said elongated loop of said electrical conductor and to which an end portion of said coil spring means is connected, means for anchoring the opposite end portion of said spring means within said tubular means, and a second electrical conductor which is in the form of a two conductor cable, one conductor of which is connected to said head member and the other conductor of which is connected to said ring and said conductors of said cable being adapted to be connected to a portable telephone set.

2. An apparatus for connecting a portable telephone set into a telephone system comprising a head member formed of electrical conductive material and provided with a telephone line engaging terminal, tubular means by which said head member is supported, a sheave disposed for rotation within a cavity formed in a portion of said head member and supported by said head member, an electrical conductor arranged within said tubular means in the form of an elongated loop and passing over said sheave, a ring formed of electrical conductive material and arranged within said tubular means to which an end portion of said electrical conductor is connected, a second telephone line engaging terminal connected to the opposite end of said electrical conductor, coil spring means which tends to resist shortening of said elongated loop of said electrical conductor when said electrical conductor is drawn outwardly from said tubular means, a block having a sheave which rides at the bottom of said elongated loop of said electrical conductor and to which an end portion of said coil spring means is connected, means for anchoring the opposite end portion of said coil spring means within said tubular means, and a second electrical conductor which is in the form of a two-conductor cable having one conductor thereof connected to said head member and the other conductor thereof connected to said ring and said two conductors of said cable being adapted to be connected to a portable telephone set.

ROY G. GRAHAM.
OSCAR F. TALLMAN.

References Cited in the file of this patent

UNITED STATES PATENTS

| Number | Name | Date |
|---|---|---|
| 458,938 | Bloomfield | Sept. 1, 1891 |
| 719,095 | Dietz | Jan. 27, 1903 |
| 1,936,463 | Strang | Nov. 21, 1933 |
| 2,117,928 | Wardell | May 17, 1938 |